No. 631,048. Patented Aug. 15, 1899.
J. MACPHAIL.
HARROW.
(Application filed Feb. 17, 1899.)
(No Model.)
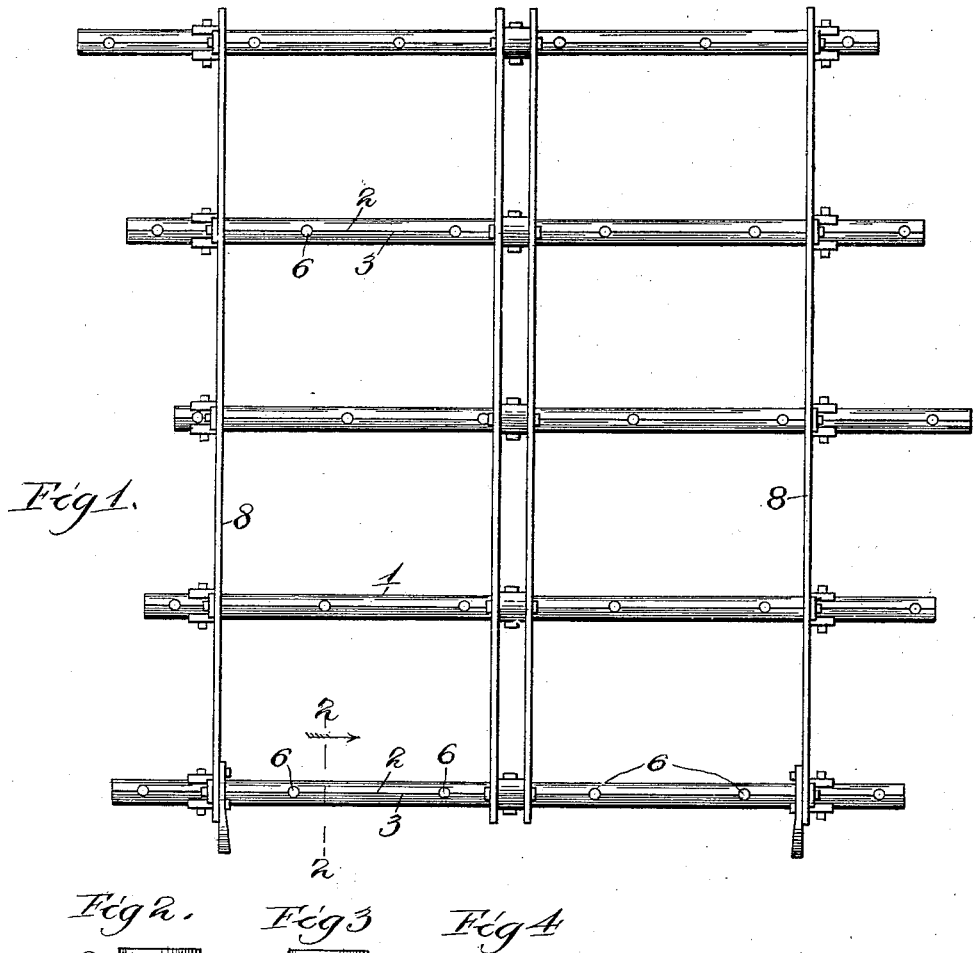
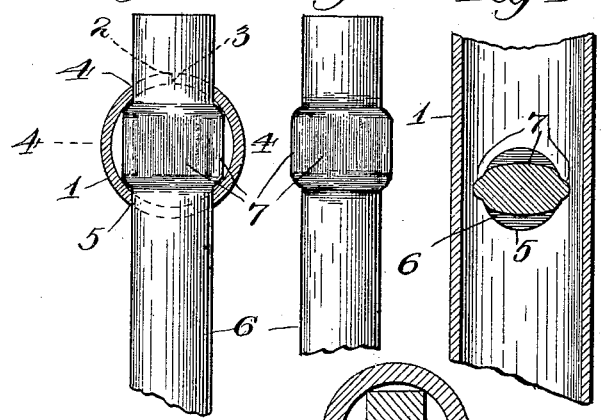
Witnesses
W. C. Coules
Allan A. Murray
Inventor
James Macphail
By Coburn, Hibben & McElroy
Attys

UNITED STATES PATENT OFFICE.

JAMES MACPHAIL, OF BLUE ISLAND, ILLINOIS.

HARROW.

SPECIFICATION forming part of Letters Patent No. 631,048, dated August 15, 1899.

Application filed February 17, 1899. Serial No. 705,776. (No model.)

*To all whom it may concern:*

Be it known that I, JAMES MACPHAIL, residing at Blue Island, in the county of Cook and State of Illinois, have invented certain new and useful Improvements in Harrows, of which the following is a specification.

My invention has relation to a harrow; and its object is to provide a simple, inexpensive, and efficient means for connecting the harrow-tooth bars with the harrow-teeth in such a manner as to dispense with riveting or the use of screws, nuts, bolts, or any other such third members or devices.

In the accompanying drawings, Figure 1 represents a plan of a harrow embodying my invention; Fig. 2, an enlarged sectional elevation on line 2 of Fig. 1; Fig. 3, an elevation of a portion of one of the harrow-teeth in its preferred form; Fig. 4, a sectional elevation on line 4 of Fig. 2, and Fig. 5 a sectional view of a modified form of construction.

The harrow-tooth pipes or bars 1 are formed from a bar or blank of any suitable resilient material, preferably steel, and of any desired or necessary dimensions. The edges 2 and 3 of the pipes or tubes meet, or substantially so, but are unconnected, the whole forming pipes having open seams. Pairs of registering holes 4 and 5 are formed in each pipe, one hole of each pair passing through the seam. The seam-holes may be formed upon opposite margins of the blank before being formed into a tube, or, as is very obvious, the pipes or tubes may be formed or rolled from a plain blank and the holes afterward formed therein.

The harrow-teeth 6 in the preferred form shown in Figs. 2, 3, and 4 are provided with a swelled portion or projection 7, arranged on opposite sides, which may be formed by flattening, though one such projection would be sufficient, although not as desirable as the form shown in the drawings. These harrow-teeth are inserted in the seam-hole first, and when driven in the seam will open to admit the swelled portion, but will afterward close in on the same, as seen in Fig. 2, so as to securely hold them therein without the use of nuts, bolts, and other objectionable means of fastening. The swelled portion of the teeth may be made to fit closely and snugly within the hollow bar. By means of this relative construction of teeth and bar a rigid joint or connection is formed therebetween.

It will be understood that I do not limit myself to the exact formation of the projection or to the number thereof as shown in the drawings so long as the same result is obtained, and therefore that any deviation therefrom in these respects will be considered as coming within the scope and meaning of my invention and claims. The pipes or bars may be connected together in any well-known or desired way, such as by the usual cross-bars 8, as shown clearly in Fig. 1.

It is obvious that a series of seam-holes alone may be used and the series of holes opposite may be dispensed with, although the preferred form illustrated in the drawings and described above will in most cases be found the more satisfactory and practical.

While in the drawings I have shown a round harrow-tooth, I do not intend to limit myself thereto, as it will be understood that the pipes or bars can be made to accommodate any other size and shape of tooth by the same manner of connection. It is also obvious that the size and shape of the holes in the bars are variable to accord with the size and shape of the teeth to be connected thereto.

It is apparent that the harrow-teeth act as keys for the split pipe or bar and resist any torsional strain to which the bar might be subjected. In case of such torsional strain the tendency of the edges at the seam is to slip upon each other, but such movement is absolutely prevented by the teeth, so that such teeth in whatever way secured in the pipe serve to resist the torsional strain and keep the pipe or bar rigid.

By the use of my invention I secure an efficient, simple, and practical joint or connection between the bars or pipes of a harrow and the harrow-teeth, and I am enabled thereby to dispense with riveting or the use of screws, bolts, nuts, and other objectionable and expensive devices.

Although I have described more or less precise forms and details of construction, I do not intend to be understood as limiting myself thereto, as I contemplate changes in form, the proportion of parts, and the substitution of equivalents as circumstances may suggest or render expedient and without departing from the spirit of my invention.

I claim—

1. A harrow comprising a series of pipes or tubes having meeting unconnected edges forming an open seam and openings or holes extending through the seam, harrow-teeth of greater width in part than, and inserted in, the holes and held therein by the resiliency of the pipes or tubes and means for connecting said pipes together in a series to form a harrow.

2. A harrow comprising a series of pipes or bars having meeting unconnected edges forming an open seam and pairs of transverse openings or holes in the pipes, one hole of each pair passing through the seam, harrow-teeth of greater width in part than the seam-opening whereby the pipe may spring apart but engage the teeth to hold the same, and means for connecting the pipes together in a series to form a harrow.

3. A harrow comprising a series of pipes having meeting unconnected edges forming an open seam and a series of openings or holes extending through the seam in each pipe, cross-bars connecting the series of pipes, and harrow-teeth, each tooth having an enlarged portion near one end which may be admitted through the hole by the opening of the seam but is held therein after the seam has closed.

4. A harrow comprising a series of hollow bars having an open longitudinal seam and pairs of holes therethrough, one of each pair passing through the seam, and harrow-teeth, each tooth having an enlarged portion near its upper end which is received within the hollow bar.

5. A harrow comprising a series of hollow bars of resilient material having an open longitudinal seam and pairs of holes therethrough, one of each pair passing through the seam, and harrow-teeth having a swelled portion upon their length adapted to spread apart the seam-hole and enter the hollow bars and to be confined therein when the bars spring back to place.

6. A harrow comprising a series of hollow bars of resilient material having an open seam and pairs of holes therethrough adapted to receive the harrow-teeth, one of each pair of holes passing through the seam, and harrow-teeth having opposite projections or swelled portions 7 upon their sides adapted to be engaged within the hollow bars.

JAMES MACPHAIL.

Witnesses:
SAMUEL E. HIBBEN,
ALLAN A. MURRAY.